United States Patent Office 2,899,440
Patented Aug. 11, 1959

2,899,440

PROCESS FOR THE MANUFACTURE OF DI-IMIDAZOLE DERIVATIVES

Adolf Emil Siegrist, Basel, and Max Duennenberger, Birsfelden, Switzerland, assignors to Ciba Limited, Basel, Switzerland, a Swiss firm No Drawing. Application May 13, 1957
Serial No. 658,523

Claims priority, application Switzerland May 18, 1956

9 Claims. (Cl. 260—309.2)

The present invention provides a process for the manufacture of di-imidazole derivatives, which in the form of the free bases correspond to the general formula

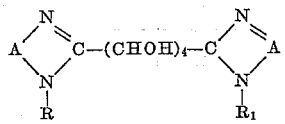

in which A represents a benzene nucleus of which two vicinal carbon atoms are bound to the two imidazole nitrogen atoms, and which may contain substituents, and R and $R_1$ each represent hydrogen or identical or different substituents. The radical A in the above formula may be substituted, for example, by a halogen atom, or an alkyl or alkoxy group. Advantageously it represents an unsubstituted phenylene radical. R and $R_1$ are advantageously hydrogen atoms. They may, however, represent any desired radicals, for example, those of heterocyclic character, but more especially aliphatic or aralphatic radicals and advantageously lower alkyl or hydroxyalkyl groups, such as methyl or hydroxy-ethyl groups, or unsaturated aliphatic hydrocarbon radicals, such allyl. The compounds of the above general formula form salts, which may be derived from inorganic acids, for example, sulfuric acid, hydrochloric acid, hydrobromic acid or phosphoric acid.

By the process of this invention the above di-imidazole derivatives are made by reacting an aromatic ortho-diamine of the benzene series, of which one amino group is primary and the other amino group is at most secondary with a compound which in its free acid state corresponds to the formula

for instance an acid of this formula or a functional derivative thereof, in the presence of a dilute aqueous mineral acid, and, if desired, reacting the di-imidazole so obtained with an alkylating, alkylenating, hydroxyalkylating or aralkylating agent.

As starting materials for the new process suitable ortho-diamines are, for example, ortho-phenylene diamine, iso-propyl-ortho-phenylene diamine, 1-methoxy-3:4-diaminobenzene, 1 - amino - 2 - mono - methylamino - benzene, 1-methyl-3:4-diaminobenzene or 1-chloro-3:4-diaminobenzene. There is advantageously used ortho-phenylene diamine.

As tetrahydroxy-dicarboxylic acids, which correspond to the formula

there may be mentioned mannosaccharic acid, idosaccharic acid, talomucic acid and allomucic acid, that is to say, dicarboxylic acids derived from aldohexoses. Advantageously there is used saccharic acid or mucic acid, since these acids are easily obtainable and have a good reactivity. As functional derivatives of these tetrahydroxy-dicarboxylic acids, which may be used for the condensation instead of the free acids, there may be mentioned more especially their lactones, and also their esters with aliphatic alcohols of low molecular weight and finally their amides.

The starting materials are reacted together by heating them in a dilute aqueous mineral acid at a moderately high temperature, advantageously in an inert gas, for example, a stream of nitrogen. As solvents there are used more especially moderately concentrated aqueous mineral acids, for example, sulfuric acid of 5–50% strength, hydrochloric acid of 5–20% strength or ortho-phosphoric acid of 15–50% strength. Temperatures within the range of 80–120° C. are advantageous for carrying out the condensation.

The alkylation or aralkylation of the di-imidazole, which may be carried out if desired, may be conducted by a method in itself known, for example, by treatment with an alkyl halide, alkylene halide, hydroxyalkyl halide or aralkyl halide, such as ethylene chlorhydrin, allyl bromide, and advantageously with the addition of an acid-binding agent. For the alkylation there may also be used dialkyl sulfates, such as dimethyl sulfate.

The compounds so obtained and their salts are colorless substances that crystallize well. They are useful as intermediate products for the manufacture of products to be applied to textiles, and especially optical bleaching agents or dyestuffs.

The following examples illustrate the invention, the parts being by weight unless otherwise stated, and the relationship of parts by weight to parts by volume being the same as that of the kilogram to the liter. Before analysis the products were dried for 24 hours over phosphorus pentoxide at 110° C. and under 12 mm. pressure:

Example 1

210 parts of mucic acid and 216 parts of freshly distilled ortho-phenylene diamine in 1500 parts by volume of sulfuric acid of 15% strength were stirred for 4 hours on a boiling water bath with the exclusion of air. The reaction mixture was then maintained at a gentle boil, while stirring, in an oil bath at 110–115° C. for 18–24 hours. 750 parts of hot water were then added, the mixture was slowly cooled to room temperature (about 15° C.), and then further stirred for 2–3 hours at that temperature. The crystalline mass that precipitated was filtered off, the filter residue was washed with cold water until neutral to Congo, and then dried. There were obtained about 474 parts of a greyish white crystalline powder, which corresponded to a yield of 90.4%. After recrystallization from sulfuric acid of 10% strength with the addition of active carbon, a condensation product of the formula

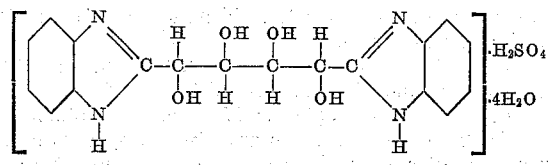

was obtained in the form of a colorless crystalline powder, which became dark in color at 212° C. and decomposed above 249° C.

Analysis.—$C_{18}H_{18}O_4N_4 \cdot 4H_2O \cdot 1H_2SO_4$: Calculated: C, 41.22; H, 5.38; N, 10.68; S, 6.11. Found: C, 41.68; H, 5.43; N, 10.69; S, 6.14

In order to obtain the free base the salt was stirred with aqueous ammonium hydroxide solution, the mixture was filtered, and the filter residue was washed with water and dried The product of the formula

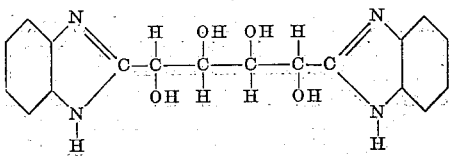

was obtained in the form of a colorless crystalline powder, which melts at 283.5–284.5° C. with decomposition.

*Analysis.*—$C_{18}H_{18}O_4N_4$: Calculated: C, 61.01; H, 5.12; N, 15.81. Found: C, 60.99; H, 5.12; N, 15.80.

Example 2

248 parts of the acid potassium salt of saccharic acid were introduced into 1750 parts by volume of sulfuric acid of 10% strength, while stirring, and with the exclusion of air. 216 parts of ortho-phenylene diamine were then distilled into the mixture and the temperature of the mixture was then raised in the course of 3 hours to the gentle boil. The solution so obtained was stirred for a further 18–24 hours at 105–110° C. with the exclusion of air. The reaction mixture was then cooled to 10–15° C. and stirred for a few hours at that temperature. The precipitated crystalline mass was filtered off, and the filter residue was washed with ice water until neutral to Congo and dried. There were obtained about 438 parts of a greyish white crystalline powder, which corresponds to a yield of 93.4%. By recrystallization from sulfuric acid of 10% strength with the addition of active carbon the condensation product of the formula

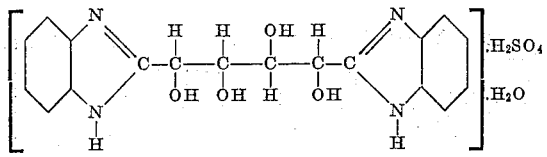

was obtained in the form of a colorless crystalline powder, which was rather easily soluble in hot water. It melts at 208–210° C. with decomposition.

*Analysis.* — $C_{18}H_{18}O_4N_4.H_2SO_4.H_2O$: Calculated: C, 45.95; H, 4.71; N, 11.91; S, 6.82. Found: C, 46.06; H, 4.83; N, 12.17; S, 697

The free base can be obtained by dissolving the above condensation product in hot water and reacting it with sodium carbonate. By filtering the mixture, cautiously washing the filter residue with water and drying it, there is obtained the product of the formula

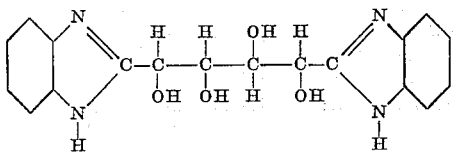

in the form of a white powder, which melts at 241–241.5° C. with decomposition.

*Analysis.*—$C_{18}H_{18}O_4N_4$: Calculated: C, 61.01; H, 5.12; N, 15.81. Found: C, 60.89; H, 5.23; N, 15.61.

If in the above example the 1750 parts by volume of sulfuric acid of 10% strength are replaced by 1500 parts by volume of phosphoric acid of 30% strength, there is obtained after reaction with an aqueous solution of ammonia of the free base described above.

Example 3

210 parts of mucic acid and 216 parts of freshly distilled ortho-phenylene diamine in 1500 parts by volume of hydrochloric acid of 10% strength were stirred with the exclusion of air for 4 hours on a boiling water bath. The reaction mixture was then maintained at the gentle boil, while stirring, in an oil bath at 110–115° C. for 18–24 hours. The mixture was cooled to about 10–15° C., stirred for 2–3 hours at that temperature, and the precipitated crystalline mass was filtered off. The filter residue was washed with ice water until neutral to Congo and dried below 100° C. under reduced pressure. The washing water was concentrated under reduced pressure to one-fifth of its volume, and then cooled to about 10° C. The precipitated crystalline mass was filtered off, and the filter residue was washed with a small amount of ice water until neutral to Congo and dried. A total of about 412 parts of a greyish white crystalline powder were obtained, which corresponds to a yield of 92.4%. The crude product melted at 281.5–282.5° C. with decomposition. After recrystallization twice from water with the addition of active carbon there was obtained the condensation product of the formula.

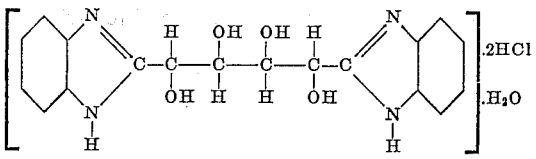

in the form of a colorless crystalline power, which melted at 287.5–288.5° C. with decomposition. It is easily soluble in hot water.

*Analysis.*—$C_{18}H_{18}O_4N_4.2HCl.H_2O$: Calculated: C, 48.55; H, 4.98; N, 12.58; Cl, 15.92. Found: C, 48.37; H, 5.12; N, 12.58; Cl, 16.21.

By reacting this salt with an aqueous solution of ammonia there is obtained the free base described in Example 1.

By using in this example instead of 1500 parts by volume of hydrochloric acid of 10% strength, 1750 parts of hydrobromic acid of 10% strength, there is obtained, after recrystallization from water with the addition of active carbon, the condensation product of the formula

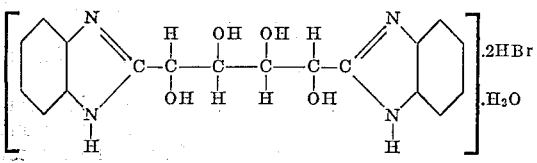

in the form of a colorless crystalline powder, which melts at 279–279.5° C. with decomposition.

*Analysis.*—$C_{18}H_{18}O_4N_4.2HBr.1H_2O$: Calculated: C, 40.47; H, 4.15; N, 10.49; Br, 29.92. Found: C, 40.29; H, 4.18; N, 10.41; Br, 29.87.

Example 4

248 parts of the acid potassium salt of saccharic acid and 216 parts of freshly distilled ortho-phenylene diamine in 1500 parts by volume of hydrochloric acid of 10% strength were heated with the exclusion of air for 4 hours on a boiling water bath. The solution so obtained was maintained at the gentle boil for a further 18–24 hours, while stirring, in an oil bath at 110–115° C. The mixture was then cooled to 0–5° C., stirred for several hours at that temperature, and the precipitated crystalline mass was filtered off. The filter residue was washed with ice water until neutral to Congo and dried below 100° C. under reduced pressure. By concentrating the washing water a further quantity of product was obtained, so that a total of about 395 parts of a brownish white crystalline powder was obtained, which corresponded to a yield of 89.7%. The crude product melted at 251.5–253° C. with decomposition. After recrystallization twice from water with the addition of active carbon there was obtained the condensation product of the formula

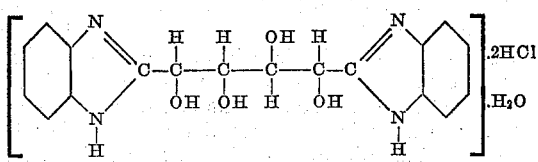

in the form of a colorless crystalline powder, which melted at 252–253° C. with decomposition. It is easily soluble in hot water.

Analysis.—$C_{18}H_{18}O_4N_4 \cdot 2HCl \cdot H_2O$: Calculated: C, 48.55; H, 4.98; N, 12.58; Cl, 15.92. Found: C, 48.46; H, 5.10; N, 12.49; Cl, 16.36.

By reacting this salt with an aqueous solution of ammonia there is obtained the free base described in Example 2.

Example 5

52.5 parts of mucic acid and 61 parts of 1-amino-2-methylamino-benzene in 500 parts by volume of sulfuric acid of 15% strength were stirred with the exclusion of air for 4 hours in a boiling water bath. The red-brown reaction solution was then maintained at the gentle boil, while stirring in an oil bath at 110–115° C. The mixture was cooled to about 10° C., and stirred for a further 2–3 hours at that temperature. The precipitated crystalline mass was filtered off, and the filter residue was washed with ice water until neutral to Congo and dried below 100° C. under reduced pressure. There were obtained about 104 parts of a beige white crystalline powder. By recrystallization from sulfuric acid of 10% strength with the addition of active carbon there was obtained the condensation product of the formula

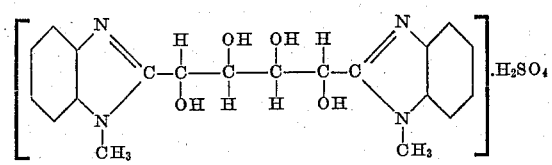

in the form of a colorless crystalline powder, which melted at 232.5–233° C. with decomposition.

Analysis.—$C_{20}H_{22}O_4N_4 \cdot H_2SO_4$: Calculated: C, 49.99; H, 5.04; N, 11.66; S, 6.67. Found: C, 49.93; H, 5.23; N, 11.60; S, 6.58.

In order to obtain the free base the above salt was stirred with an aqueous solution of ammonia, the mixture was filtered, and the filter residue was washed with water and dried. There was obtained the product of the formula

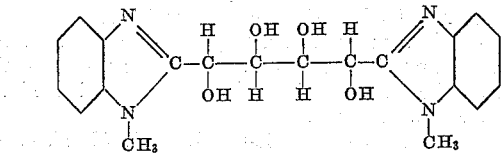

in the form of a colorless crystalline powder, which melted at 259–261° C. with decomposition.

Analysis.—$C_{20}H_{22}O_4N_4$: Calculated: C, 62.81; H, 5.80; N, 14.65. Found: C, 62.71; H, 5.86; N, 14.79.

In the reaction as described in the present example there may be used equivalent quantities of one of the following diamines instead of the above indicated 61 parts of 1-amino-2-methyl-amino-benzene:

1-amino-2-ethylamino-benzene,
1-amino-2-n-propylamino-benzene,
1-amino-2-isopropylamino-benzene,
1-amino-2-allylamino-benzene,
1-amino-2-benzylamino-benzene.

Example 6

52.5 parts of mucic acid and 61 parts of 1-methyl-3:4-diaminobenzene in 800 parts by volume of sulfuric acid of 15% strength were stirred with the exclusion of air for 4 hours on a boiling water bath. The reaction mixture was then maintained at a gentle boil, while stirring, in an oil bath at 110–115° C. for 18–24 hours. The mixture was then cooled to about 10° C., stirred at that temperature for a further 1–2 hours, and the precipitated crystalline mass was filtered off. The filter residue was washed with ice water until neutral to Congo and dried below 100° C. under reduced pressure. There were obtained about 80 parts of a beige white crystalline powder. By recrystallization from a large quantity of sulfuric acid of 10% strength with the addition of a small amount of active carbon, there was obtained the condensation product of the formula

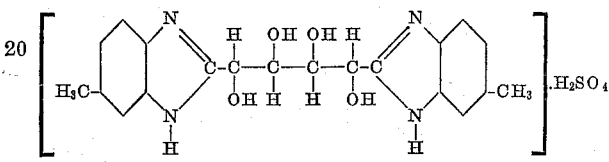

in the form of a colorless crystalline powder, which became dark in color and decomposed above 210° C.

In order to obtain the free base the above salt was stirred with an aqueous solution of ammonia, the mixture was filtered, and the filter residue was washed with water and dried. There was obtained the product of the formula

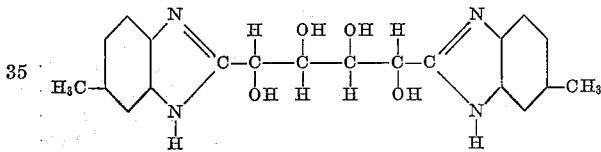

in the form of a colorless crystalline powder, which melted at 275.5–276° C. with decomposition.

Analysis.—$C_{20}H_{22}O_4N_4$: Calculated: C, 62.81; H, 5.80; N, 14.65. Found: C, 62.68; H, 5.92; N, 14.51.

By using in the above example, instead of 52.5 parts of mucic acid, 62 parts of the acid potassium salt of saccharic acid, there is obtained, after reaction with an aqueous solution of ammonia, the free base of the formula

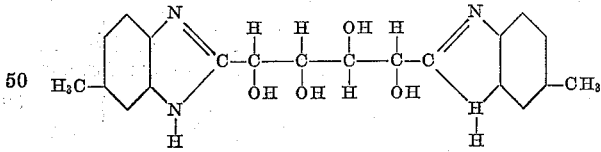

in the form of a colorless crystalline powder, which melts at 226.5–227° C. with decomposition, after recrystallization from aqueous ethanol with the addition of active carbon. It dissolves in hot ethanol.

Analysis.—$C_{20}H_{22}O_4N_4$: Calculated: C, 62.81; H, 5.80; N, 14.65. Found: C, 62.65; H, 5.88; N, 14.55.

Example 7

52.5 parts of mucic acid and 69 parts of 1-methoxy-3:4-diaminobenzene in 1000 parts by volume of sulfuric acid of 15% strength were stirred with the exclusion of air for 4 hours on a boiling water bath. The slightly reddish reaction mixture was then maintained at the gentle boil, while stirring, in an oil bath at 110–115° C. for 18–24 hours. 500 parts of water were then added to the brown reaction solution, the mixture was cooled to about 10° C., then stirred for a further 1–2 hours at that temperature and the precipitated crystalline mass was filtered off. The filter residue, after being washed with ice water until neutral to Congo, was crystallized from a large quantity of sulfuric acid of 10% strength with the addition of active charcoal. After drying the product below 100° C.

under reduced pressure there was obtained the condensation product of the formula

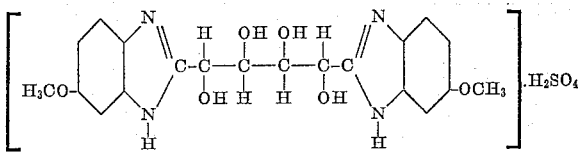

in the form of colorless felted small needles, which decomposed at 231–232° C.

*Analysis.*—$C_{20}H_{22}O_6N_4 \cdot H_2SO_4$: Calculated: C, 46.87; H, 4.72; N, 10.93; S, 6.26. Found: C, 46.75; H, 4.81; N, 11.03; S, 6.21.

In order to prepare the free base the above salt was stirred with an aqueous solution of ammonia, the mixture was filtered, and the filter residue was washed with water and dried. There was obtained the product of the formula

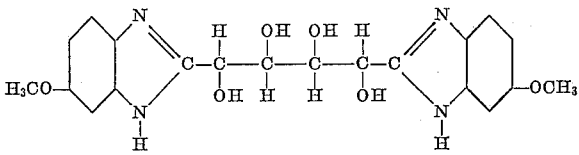

in the form of a colorless crystalline powder, which melted at 266–266.5° C. with decomposition.

*Analysis.*—$C_{20}H_{22}O_6N_4$: Calculated: C, 57.96; H, 5.35; N, 13.52. Found: C, 57.84; H, 5.53; N, 13.43.

*Example 8*

52.5 parts of mucic acid and 71.3 parts of 1-chloro-3:4-diaminobenzene in 750 parts by volume of hydrochloric acid of 10% strength are stirred with the exclusion of air for 4 hours on a boiling water bath. The reaction mixture is then maintained at the gentle boil, while stirring, in an oil bath at 110–115° C. for 18–24 hours. The mixture is cooled to 5° C., then stirred for 2 hours at that temperature, and the precipitated crystalline mass is filtered off. The filter residue is washed neutral to Congo with ice water and then stirred with an aqueous solution of ammonia. By filtration, washing the filter residue with ice water and drying it below 100° C. under reduced pressure, there are obtained about 90 parts of a slightly brownish powder. By recrystallization from sulfuric acid of 15% strength with the addition of active carbon the condensation product of the formula

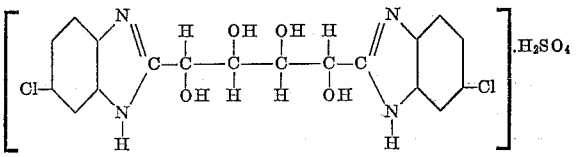

is obtained in the form of colorless small needles, which become dark in color above 217° C.

The free base can be obtained by reacting the above condensation product with an aqueous solution of ammonia. By filtration, washing the filter residue with water and drying it there is obtained the product of the formula

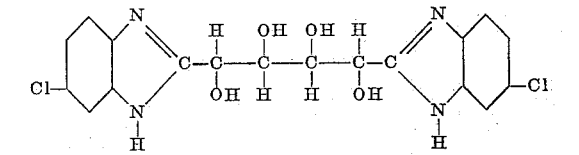

in the form of a colorless crystalline powder, which melts at 289–290° C. with decomposition.

*Analysis.*—$C_{18}H_{16}O_4N_4Cl_2$: Calculated: C, 51.08; H, 3.81; N, 13.24; Cl, 16.75. Found: C, 51.04; H, 3.94; N, 13.31; Cl, 16.64.

*Example 9*

133 parts of mucic acid diethyl ether and 108 parts of freshly distilled ortho-phenylene diamine in 1000 parts by volume of sulfuric acid are stirred on a boiling water-bath for 36 to 44 hours with the exclusion of air, the condensation product beginning to precipitate as crystals from the pale brown reaction solution after 1½ to 2 hours. The mixture is cooled to 5 to 10° C., then stirred for 3 hours at that temperature, and the precipitated crystalline mass is filtered off. The filter residue is washed neutral to Congo with ice water and then dried below 100° C. There are obtained about 230 parts of a greyish white powder correspoding to a yield of 87.8%. After recrystallization from sulfuric acid of 10% strength with the addition of active carbon the condensation product described in Example 1 is obtained in the form of a colorless crystalline powder. By reacting the condensation product with an aqueous solution of ammonia, the free base described in Example 1 is obtained which melts at 283.5 to 284.5° C. with decomposition.

*Example 10*

A mixture of 235 parts of the condensation product of the formula

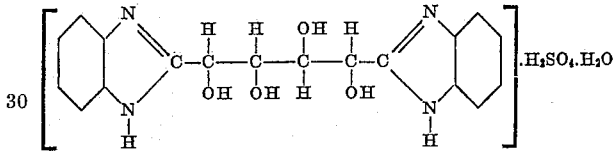

and 60 parts of urea in 750 parts by volume of glacial acetic acid is heated at the boil under reflux for 17 hours. From the originally brown reaction solution yellow needles gradually precipitate. The mixture is slowly cooled to room temperature (18 to 20° C.) and then stirred for 1 to 2 hours at that temperature. The precipitated crystalline reaction product is then separated by filtration, washed first with glacial acetic acid and then with water, and then dried. To prepare the free base the reaction product is put into hot water, and sodium carbonate is added with stirring. After filtering the mixture, washing it with water and drying, there is obtained 2,5-di-[benzimidazyl-(2)]-pyrrole of the formula

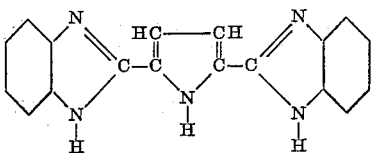

in the form of a pale, brownish yellow powder which is soluble in aqueous sodium hydroxide solution in the cold and exhibits intensive violet blue fluorescence. It can be obtained in a pure state by recrystallization from aqueous methyl alcohol in the form of pale yellow small needles. The new pyrrole derivative can be heated to 310° C. without melting.

*Analysis.*— $C_{18}H_{13}N_5$: Calculated: C, 72.22; H, 4.38; N, 23.40. Found: C, 72.08; H, 4.68; N, 23.42.

*Example 11*

A mixture of 156 parts of the condensation product of the formula

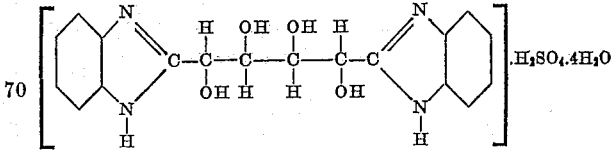

and 60 parts of urea in 800 parts by volume of glacial acetic acid is maintained at a gentle boil under reflux for 20 hours with stirring. From the originally colorless reaction mixture yellow needles gradually precipitate. The mixture is slowly cooled to room temperature (18 to 20° C.), stirred for 1 to 2 hours at that temperature, and the precipitated reaction product is filtered. After washing the filter residue with glacial acetic acid and water and then drying, there is obtained a yellowish crystalline powder. To prepare the free base the so-obtained product is put into hot water, and sodium carbonate is added with stirring. After filtering the mixture, washing with water and drying, there is obtained 2,5-di-[benzimidazyl-(2)]-pyrrole of the formula

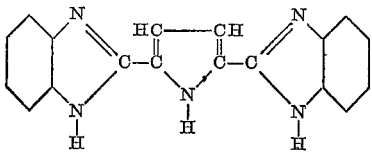

in the form of a pale yellow powder. By recrystallization from aqueous methyl alcohol, the new pyrrole derivative is obtained in a pure state in the form of pale yellow small needles. It shows the same infra-red spectrum as the product of Example 10.

Analysis.—$C_{18}H_{13}N_5$: Calculated: C, 72.22; H, 4.38; N, 23.40. Found: C, 72.31; H, 4.56; N, 23.32.

The other α:β-di-[benzimidazyl-(2)]-tetrahydroxybutanes described in Examples 1–9 can also be converted into the corresponding pyrrole derivatives in the manner indicated in Examples 10 and 11.

What is claimed is:

1. Process for the manufacture of di-imidazole derivatives which comprises reacting in the presence of a dilute aqueous mineral acid and in the absence of organic solvents at a temperature within the range of 80 to 120° C., about two molecular proportions of an aromatic orthodiamine of which one amino group is primary and the other amino group is at most secondary, with one molecular proportion of a compound which in its free acid state corresponds to the formula $$\begin{array}{c} COOH \\ (CHOH)_4 \\ COOH \end{array}$$

2. Process for the manufacture of di-imidazole derivatives which comprises reacting in the presence of a dilute aqueous mineral acid and in the absence of organic solvents at a temperature within the range of 80 to 120° C., about two molecular proportions of an aromatic ortho-diamine of the formula

in which R represents a benzene radical, two vicinal carbon atoms of which are bound to the nitrogen atoms, n represents a whole number of at most 2, and R' represents an aliphatic hydrocarbon radical containing at the most 3 carbon atoms, with one molecular proportion of a compound which in its free acid state corresponds to the formula

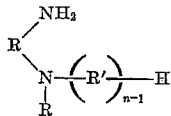

3. Process for the manufacture of di-imidazole derivatives which comprises reacting at a temperature within the range of 80–120° C. in the presence of aqueous sulfuric acid of 5–50% strength and in the absence of organic solvents, about two molecular proportions of an aromatic ortho-diamine of the formula

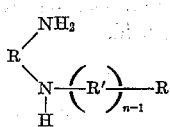

in which R represents a benzene radical two vicinal carbon atoms of which are bound to the nitrogen atoms, n represents a whole number of at the most 2, and R' represents an aliphatic hydrocarbon radical containing at the most 3 carbon atoms, with one molecular proportion of a compound which in its free acid state corresponds to the formula $$\begin{array}{c} COOH \\ (CHOH)_4 \\ COOH \end{array}$$

4. Process for the manufacture of di-imidazole derivatives which comprises reacting at a temperature within the range of 80–120° C. in the presence of aqueous hydrochloric acid of 5–20% strength and in the absence of organic solvents, about two molecular proportions of an aromatic ortho-diamine of the formula

in which R represents a benzene radical, two vicinal carbon atoms of which are bound to the nitrogen atoms, n represents a whole number of at the most 2, and R' represents an aliphatic hydrocarbon radical containing at the most 3 carbon atoms, with one molecular proportion of a compound which in its free acid state corresponds to the formula

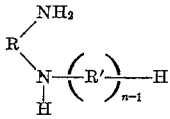

5. Process for the manufacture of a di-imidazole derivative which comprises reacting at a temperature within the range of 80–120° C. in the presence of aqueous sulfuric acid of about 15% strength and in the absence of organic solvents, about two molecular proportions of ortho-phenylene diamine with one molecular proportion of mucic acid.

6. Process for the manufacture of a di-imidazole derivative which comprises reacting at a temperature within the range of 80–120° C. in the presence of aqueous sulfuric acid of about 10% strength and in the absence of organic solvents, about two molecular proportions of ortho-phenylene diamine with one molecular proportion of the monopotassium salt of saccharic acid.

7. Process for the manufacture of a di-imidazole derivative which comprises reacting at a temperature within the range of 80–120° C. in the presence of aqueous hydrochloric acid of about 10% strength and in the absence of organic solvents, about two molecular proportions of ortho-phenylene diamine with one molecular proportion of mucic acid.

8. Process for the manufacture of a di-imidazole derivative which comprises reacting at a temperature within the range of 80–120° C. in the presence of aqueous hydrochloric acid of about 10% strength and in the absence of organic solvents, about two molecular proportions of ortho-phenylene diamine with one molecular proportion of the monopotassium salt of saccharic acid.

9. Process for the manufacture of a di-imidazole derivative which comprises reacting at a temperature within the range of 80–120° C. in the presence of aqueous sulfuric acid of about 15% strength and in the absence of organic solvents, about two molecular proportions of 1-amino-2-methyl-amino-benzene with one molecular proportion of mucic acid.

References Cited in the file of this patent

UNITED STATES PATENTS 2,488,094    Graenacher et al. _____ Nov. 15, 1949

OTHER REFERENCES

Elderfield: Heterocyclic Compounds, vol. 5, pp. 276–8 (1957).
Shriner et al.: J. Am. Chem. Soc., vol. 63, p. 2277 (1941).
Lohmar: J. Biol. Chem., vol. 143, pp. 551–4 (1942).
Efros: Chem. Abstracts, vol. 47, col. 12366 (1953).

UNITED STATES PATENT OFFICE
CERTIFICATE OF CORRECTION

Patent No. 2,899,440                                              August 11, 1959

Adolf Emil Siegrist et al.

It is hereby certified that error appears in the printed specification of the above numbered patent requiring correction and that the said Letters Patent should read as corrected below.

Column 1, lines 18 to 23, the extreme right-hand portion of the formula should appear as shown below instead of as in the patent:

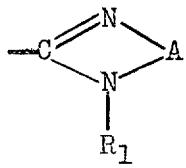

column 1, line 38, after "such" insert -- as --; column 3, line 68, before "the", strike out "of"; column 8, line 13, for "correspoding" read -- corresponding --.

Signed and sealed this 31st day of May 1960.

(SEAL)
Attest:

KARL H. AXLINE                                                    ROBERT C. WATSON
Attesting Officer                                      Commissioner of Patents